(12) United States Patent
Tran

(10) Patent No.: US 6,694,458 B1
(45) Date of Patent: Feb. 17, 2004

(54) METHOD AND SYSTEM FOR AUTOMATICALLY VALIDATING A HEADER SEARCH IN READING DATA FROM AN OPTICAL MEDIUM

(75) Inventor: Paul Tran, Milpitas, CA (US)

(73) Assignee: Mosel Vitelic Corporation, San Jose, CA (US)

( * ) Notice: Subject to any disclaimer, the term of this patent is extended or adjusted under 35 U.S.C. 154(b) by 546 days.

(21) Appl. No.: 09/656,502

(22) Filed: Sep. 7, 2000

(51) Int. Cl.[7] .......... G06F 11/00; G11B 21/08; G11B 7/00
(52) U.S. Cl. .............. 714/48; 714/6; 714/52; 369/32; 369/47.1
(58) Field of Search .............. 714/5, 6, 7, 8, 714/42, 822, 48, 52; 369/32, 44.25, 47.1, 30.15, 30.1

(56) References Cited

U.S. PATENT DOCUMENTS

| 5,416,760 | A | * | 5/1995 | Masood et al. | ............ 369/47.2 |
| 5,437,020 | A | * | 7/1995 | Wells et al. | .................... 714/6 |
| 5,940,358 | A | * | 8/1999 | Kato | ...................... 369/30.23 |
| 6,058,453 | A | * | 5/2000 | Packer | ...................... 711/112 |
| 6,198,705 | B1 | * | 3/2001 | Tran et al. | ............... 369/32.01 |

* cited by examiner

Primary Examiner—Robert Beausoliel
Assistant Examiner—Emerson Puente
(74) Attorney, Agent, or Firm—Sawyer Law Group LLP

(57) ABSTRACT

The present invention provides a method and system for providing a header search in a data read from an optical medium. The method includes opening a search window with a size greater than one sector; finding at least one valid header within the search window; and locating a target sector based upon the at least one valid header. The size of the window is programmable. Optionally, more than one valid header can be required to be found before they are used as the reference, for the purpose of increasing the reliability of the reference. The number of required valid headers is also programmable. Buffering of the data then begins at the target sector found based on the reference. The header of this target sector is then checked for validity. If the header is not the target, then the header search may be restarted without the need to redo the data read. The header search scheme is applicable for multiple optical data formats. By using a search window of a programmable size and the power of ECC correction in the header search, the reliability of the search is significantly increased, the amount of reading redo is decreased, the throughput of the data is improved, and the same logic may be used for multiple data formats without intervention from the controller's firmware. This scheme provides an additional ability to continually validate the headers of the buffered data. This additional feature increases the reliability of the read data and saves time.

23 Claims, 4 Drawing Sheets

METHOD AND SYSTEM FOR AUTOMATICALLY VALIDATING A HEADER SEARCH IN READING DATA FROM AN OPTICAL MEDIUM

FIELD OF THE INVENTION

The present invention relates to reading of data from optical media, and more particularly to a header search in reading data from optical media.

BACKGROUND OF THE INVENTION

When directed to read data from an optical medium, such as a Compact Disc (CD) or Digital Video Disc (DVD), by an optical drive controller, the mechanical servo moves over the medium to the track of the target sector, and begins reading. The controller determines if the servo is at the correct location by using the identifying information in the headers of the read sectors. The controller searches for the target sector header. Once the target sector header is found and validated, buffering of the data begins. However, if the target sector header is damaged during demodulation, then the target sector cannot be identified. Once the controller identifies a sector subsequent to the target sector, it realizes that the servo has passed the target sector, and the header search is redone. Each time the controller redoes the header search, valuable time is wasted.

One conventional method of improving the header search is to search for the header of the sector immediately before the target sector header. If the controller locates the sector immediately before, it counts one sector and begins buffering at that sector. Thus, even if the target sector header is damaged, buffering still begins at the target sector. If the header of the sector immediately before is damaged, the controller can still find the undamaged target sector header and begin buffering, thus decreasing the times the controller must redo the header search. However, a problem still exists if the headers of both the target sector and the sector immediately before are damaged.

Accordingly, there exists a need for an improved method and system for validating a header search in reading data from an optical medium. The improved method and system should be easy to implement and further decrease the times the controller must redo the header search. The present invention addresses such a need.

SUMMARY OF THE INVENTION

The present invention provides a method and system for providing a header search in a data read from an optical medium. The method includes opening a search window with a size greater than one sector; finding at least one valid header within the search window; and locating a target sector based upon the at least one valid header. The size of the window is programmable. Optionally, more than one valid header can be required to be found before they are used as the reference, for the purpose of increasing the reliability of the reference. The number of required valid headers is also programmable. Buffering of the data then begins at the target sector found based on the reference. The header of this target sector is then checked for validity. If the header is not the target, then the header search may be restarted without the need to redo the data read. The header search scheme is applicable for multiple optical data formats. By using a search window of a programmable size and the power of ECC correction in the header search, the reliability of the search is significantly increased, the amount of reading redo is decreased, the throughput of the data is improved, and the same logic may be used for multiple data formats without intervention from the controller's firmware. This scheme provides an additional ability to continually validate the headers of the buffered data. This additional feature increases the reliability of the read data and saves time.

DETAILED DESCRIPTION

The present invention provides an improved method and system for validating a header search in reading data from an optical medium. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a header search scheme which uses a search window greater than one sector immediately before the target sector. The size of the window is programmable. If a valid header is found within the search window, then it is used as a reference in locating the target sector. Optionally, more than one valid header can be required to be found before they are used as the reference, for the purpose of increasing the reliability of the reference. The number of required valid headers is also programmable. Buffering of the data then begins at the target sector found based on the reference. The header of this target sector is then checked for validity. If the header is not the target, and has not been passed, then the header search may be restarted without the need to redo the data read. The header search scheme is applicable for multiple optical data formats, including Compact Disc Read Only Memory (CDROM), Compact Disc Audio Data (CD-audio), and Digital Video Disc (DVD) formats. This scheme provides an additional ability to continually validate the headers of the buffered data.

To more particularly describe the features of the present invention, please refer to FIGS. 1 through 4 in conjunction with the discussion below.

Figure 1:
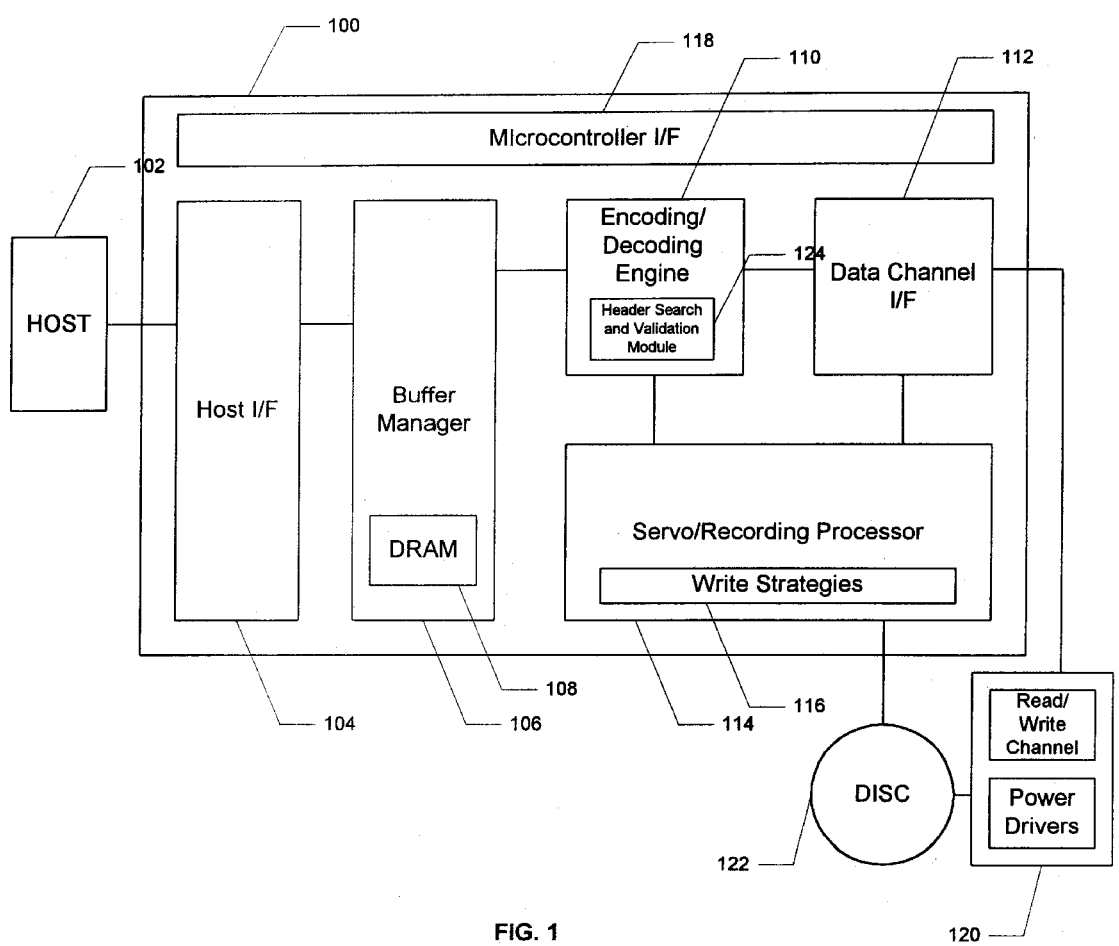
FIG. 1 is a block diagram illustrating a preferred embodiment of a controller which may use the method and system in accordance with the present invention.

FIG. 1 is a block diagram illustrating a preferred embodiment of a controller which may use the method and system in accordance with the present invention. The elements 104–118 represent the logical architecture of the controller 100. The controller 100 comprises a host interface 104, a buffer manager 106 with an embedded memory 108, an integrated encoding/decoding engine 110, a data channel interface 112, an integrated servo/recording processor 114 embedded with the write strategies 116, and a microcontroller interface 118. The integrated encoding/decoding engine 110 comprises a Header Search and Validation module 124 to search for the valid target sector header and to validate the header at each subsequent sector boundary. In the preferred embodiment, the embedded memory 108 is an embedded dynamic random access memory (DRAM). The integrated servo/recording processor 114 provides the mechanical control of the disc 120 and the spindle and sledge (not shown) of the drive for both reading and writing of data. The servo/recording processor 114 interfaces with the disc 122 in the writing of data. Integrated into the processor 114 are the write strategies 116 which controls the writing of the data so that they data is in a standard format. The write control logic in accordance with the present invention would be part of the servo/recording processor 114 for controller 100. The controller 100 is further described in co-pending U.S. patent application Ser. No. 09/652,254 entitled "Integrated Controller To Process Both Optical Reads And Optical Writes Of Multiple Optical Media", Ser. No. (1567P), filed on Aug. 30, 2000. Applicant hereby incorporates this patent application by reference.

Figure 2:
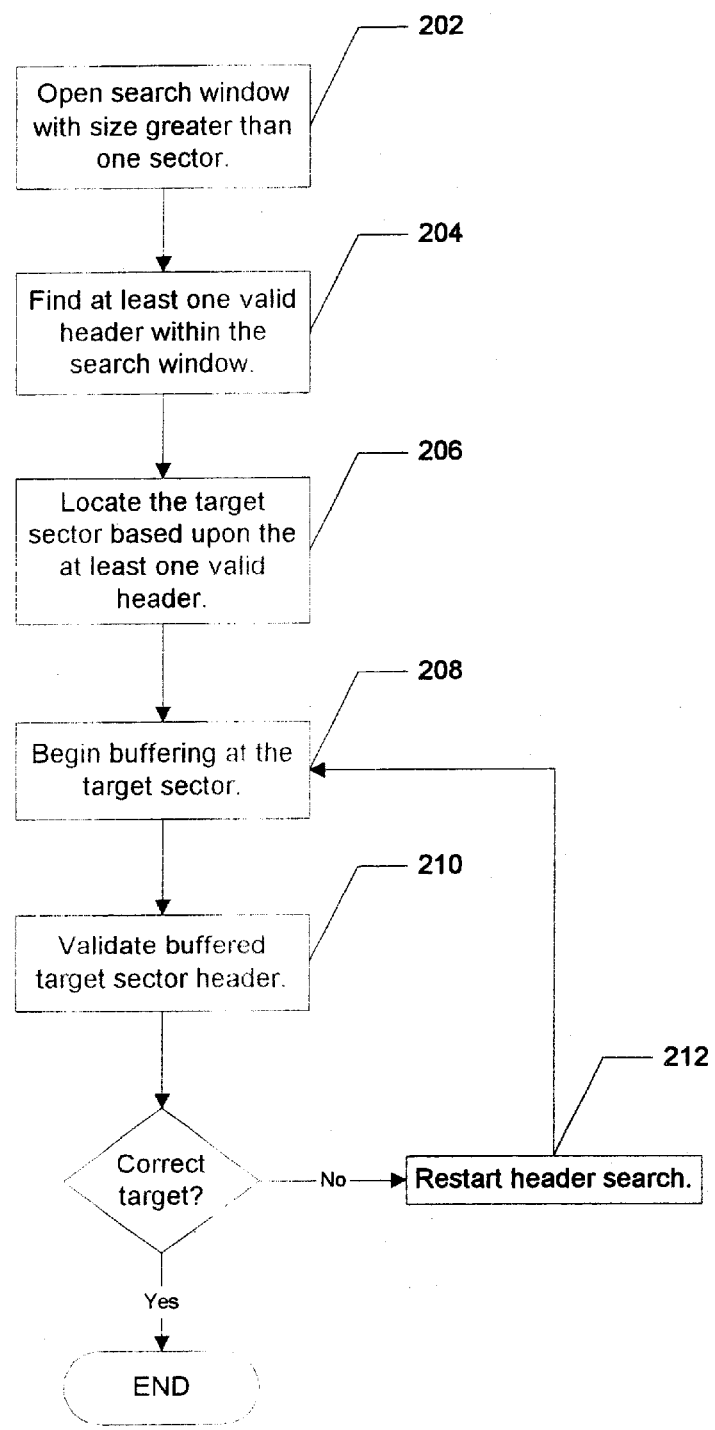
FIG. 2 is a flow chart illustrating a preferred embodiment of a method for validating a header search in accordance with the present invention.

FIG. 2 is a flow chart illustrating a preferred embodiment of a method for validating a header search in accordance with the present invention. First, a search window of a size greater than one sector is opened, via step 202. In the preferred embodiment, the size of the search window is previously programmed, and may be up to 16 sectors wide. Next, at least one valid header is found within the search window, via step 204. In the preferred embodiment, the actual number of required valid headers has also been previously programmed. Then, the target sector is located based upon the at least one valid header, via step 206, i.e., the at least one valid header is used as a reference to locate the target sector. The buffering of data begins at the target sector, via step 208. The buffered target sector header is then validated, via step 210. If the buffered target sector header is not valid, i.e., the buffered target sector header is not correct, then the header search is restarted, via step 212. Otherwise, the correct target sector has been found, and the buffering of data continues. This scheme is applicable to multiple optical data formats, including CDROM, CD-audio, and DVD data.

Figure 3:
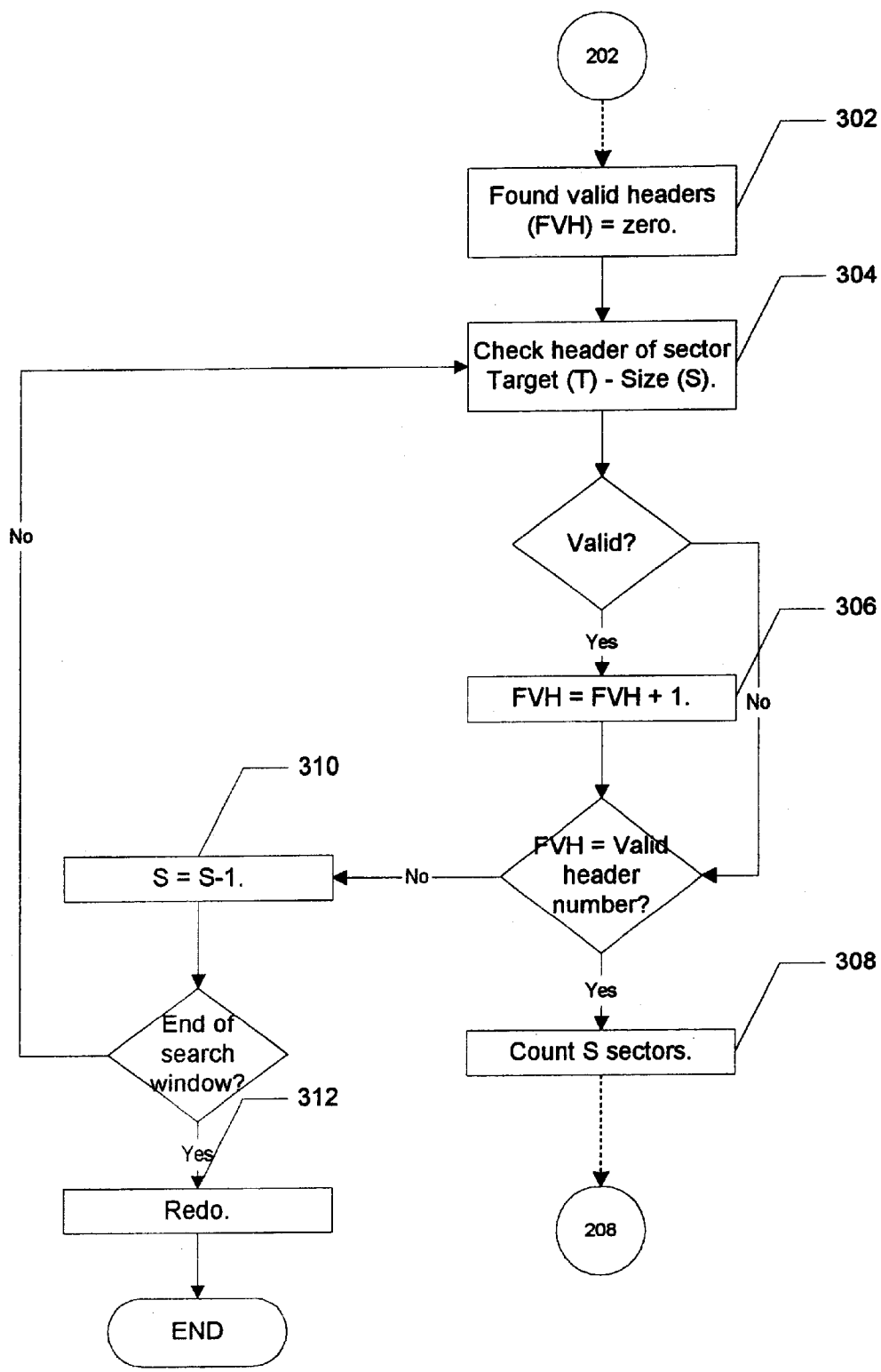
FIG. 3 illustrates a flow chart illustrating in more detail the header search utilizing the search window in accordance with the present invention.

FIG. 3 illustrates a flow chart illustrating in more detail the header search utilizing the search window in accordance with the present invention. Assume that the search window is 8 sectors wide and the required found valid headers (FVH) is 2. After the search window is opened, via step 202, FVH is set to zero, via step 302. Next, the header of the sector at the beginning of the search window is checked, via step 304. For example, if the target sector has ID=100, then the sector with ID=92 (target (T)–size (S) or 100–8), is checked. Assume that the header of sector 92 is valid. Then FVH is incremented by one, via step 306. Since FVH has not yet reached two, the Header Search and Validation module 124 prepares to check the next sector in the search window. Conceptually, S is decremented by one to 7, via step 310. Since the end of the window has not been reached, the header of sector 93 (100–7) is checked, via step 304. Assume that the header for sector 93 is not valid. Then, the FVH is not incremented. Since the FVH has not yet reached two, S is decremented further by one to 6, via step 310. Since the end of the search window has not been reached, the header of sector 94 (100–6) is checked, via step 304. Assume that the header of sector 94 is valid. FVH is incremented by one, via step 306. Since FVH has now reached two, sector 94 is used as a reference. The Header Search and Validation module 124 counts 6 sectors to find the target sector, via step 308. Buffering then begins at sector 100, via step 208.

Conventionally, the sectors are buffered by rows. At the beginning of the row is the header. At the end of each row are Error Correction Code (ECC) bits for correcting errors incurred during demodulation. Once a row is buffered, ECC correction can be performed on the row. Conventionally, this ECC correction of rows is referred to as "Q-correction" for CDROM data and "row correction" for DVD data, but in this specification, they will be collectively referred to as "row correction". Once all of the rows are buffered, ECC correction can be performed on the columns. Conventionally, this ECC correction of columns is referred to as "P-correction" for CDROM data and "column correction" for DVD data, but in this specification, they will be collectively referred to as "column correction". ECC correction is well known in the art and will not be described further here. For CDROM, CD-audio, and DVD data, ECC correction is available for the data portion of the sectors. But for CD-audio and DVD data, ECC correction is not available for the header. Instead, Cyclic Redundancy Check (CRC) bits are provided with the data to indicate the existence of error in the header, but correction of the errors is not available.

Figure 4:
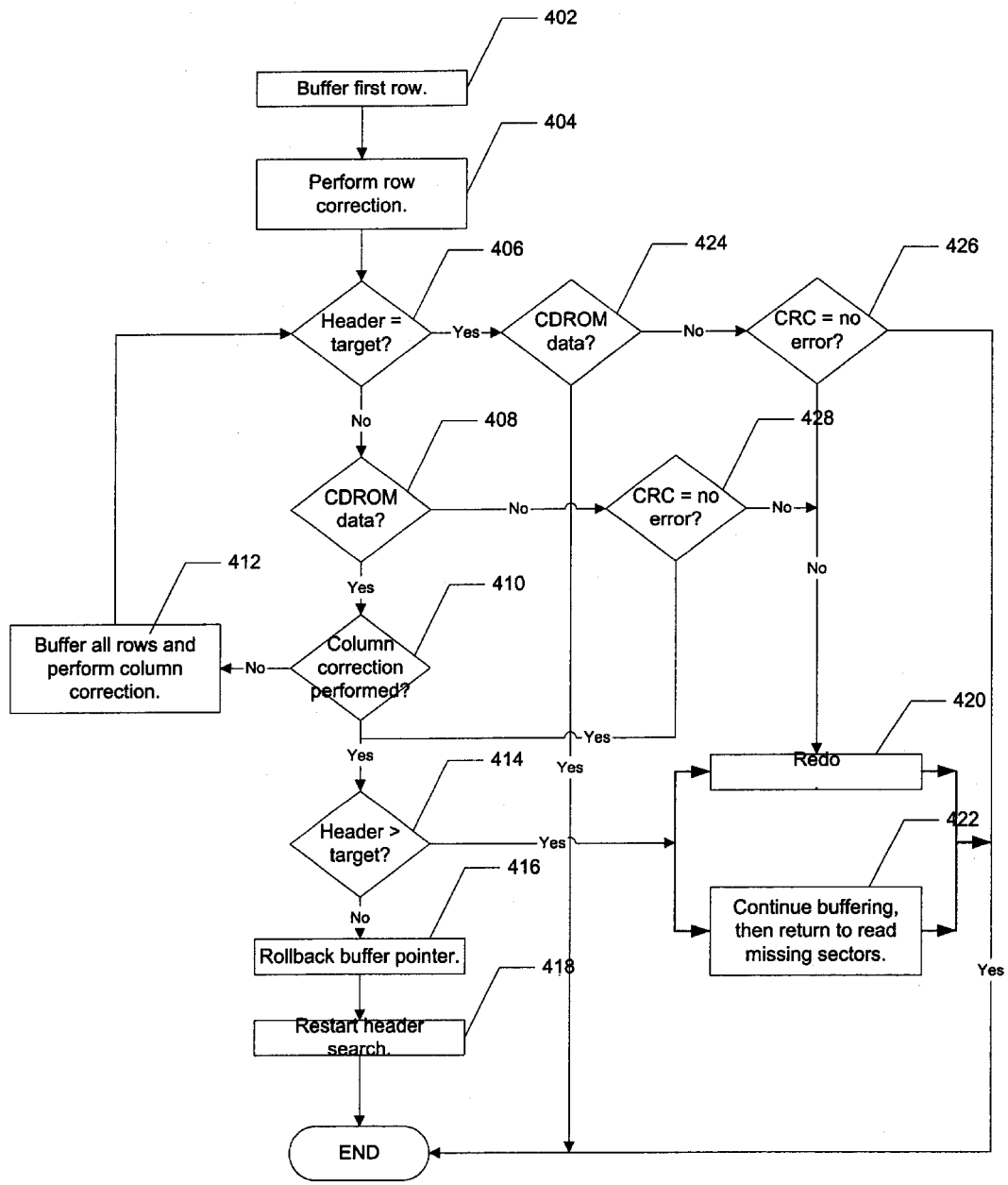
FIG. 4 is a flow chart illustrating in more detail the validation of the buffered target sector in accordance with the present invention.

Once the buffering begins, the header of the buffered target sector is validated, via step 210 (FIG. 2). FIG. 4 is a flow chart illustrating in more detail the validation of the buffered target sector in accordance with the present invention. First, the first row is buffered, via step 402. Next, row correction is performed, via step 404. Then the buffered target sector header is checked to determine if it is the correct target sector, via step 406.

For CDROM data, the row correction may correct any errors in the header so that the header validation is more reliable. If the header is the target, via step 406, and the data is CDROM, via step 424, then the scheme is exited. The buffering of the CDROM data continues. If the header is not the target, via step 406, and the data is CDROM, via step 408, then it is determined if column correction has already been performed, via step 410. If not, then all rows are buffered and then column correction is performed, via step 412. Then, the header is checked again, via step 406. If the header is still not the target, then it is determined if the header is greater than the target, via step 414. If the header is not greater, then the buffering began too early. The data already buffered is not relevant so a buffer pointer is rolled back to the beginning of the buffered data, via step 416. The header search is then restarted, via step 418. Thus, when the correct target sector is buffered, the irrelevant data already buffered will be overwritten since the buffer pointer has been rolled back. If the header is greater than the target, via step 414, then the target sector has been passed. Two options are available. The reading may be redone, via step 420, or the buffering can continue, and then the controller 100 can return to read the missing sectors from prior to the buffered sectors, via step 422. Which option is implemented may be determined prior to the execution of the scheme.

For non-CD-audio data, even if the header is the target, via step 406, the CRC must be checked as well, via step 426, since row correction of non-CD-audio data does not correct errors in the header. The header may be damaged such that it erroneously indicates the target. If the CRC indicates no error, via step 426, then the scheme is exited and buffering of the non-CD-audio data continues. If the CRC indicates an error, via step 426, then the data reading is redone, via step 420. If the header is not the target, via step 406, and the CRC indicates no error, via step 428, then it is determined if the header is greater than the target, via step 414. If it is greater, then steps 414 through 418 are performed. If it is not greater, than either steps 420 or 422 is performed. If the header is not the target, via step 406, and the CRC indicates an error, via step 428, then the reading of the data is redone, via step 420.

By using a search window of a programmable size and the power of ECC correction in the header search as described above, the reliability of the search is significantly increased and validation may be performed without intervention by the firmware of the controller 100, improving the throughput of the data. Also, the same scheme may be used with multiple optical data formats, including CDROM, CD-audio, and DVD. Thus, the same logic may be used for multiple data formats.

The present invention also provides an additional feature which may be optionally implemented. Since the header search scheme described above uses the power of ECC correction, the same scheme may also be used for the remaining buffered data as well as for the target sector. If the servo briefly loses either its focus and/or its tracking during the buffering of the data after the target sector is validated, then the buffered data is erroneous. However, since the headers of this data is not validated, the error is not detected until far later. The error is detected during the buffering, by performing steps 404–428 of the scheme (FIG. 4) for each buffered row, except the header is compared with the expected sector header at steps 406 and 414. This additional feature increases the reliability of the read data and saves time by detecting the error sooner.

Although the present invention has been described in the context of the controller 100, one of ordinary skill in the art will understand that other controllers may use the described scheme without departing from the spirit and scope of the present invention.

A method and system for automatically validating a header search in reading data from an optical medium has been disclosed. The present invention provides a header search scheme which uses a search window greater than one sector immediately before the target sector. The size of the window is programmable. If a valid header is found within the search window, then it is used as a reference in locating the target sector. Optionally, more than one valid header can be required to be found before they are used as the reference, for the purpose of increasing the reliability of the reference. The number of required valid headers is also programmable. Buffering of the data then begins at the target sector found based on the reference. The header of this target sector is then checked for validity. If the header is not the target, then the header search may be restarted without the need to redo the data read. The header search scheme is applicable for multiple optical data formats, including CDROM, CD-audio, and DVD formats. By using a search window of a programmable size and the power of ECC correction in the header search, the reliability of the search is significantly increased, the amount of reading redo is decreased, the throughput of the data is improved, and the same logic may be used for multiple data formats without intervention from the controller's firmware. This scheme provides an additional ability to continually validate the headers of the buffered data. This additional feature increases the reliability of the read data and saves time.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a header search in a data read from an optical medium, comprising the steps of:

(a) opening a search window with a size greater than one sector;

(b) finding at least one valid header within the search window;

(c) locating a target sector based upon the at least one valid header;

(d) buffering data beginning at the target sector; and (e) performing validation of a buffered target sector header, wherein the validating step (e) comprises:

(e1) determining if the buffered target sector header is a correct target;

(e2) determining if a Cyclic Redundancy Check (CRC) indicates an error, if the buffered target sector header is not the correct target;

(e3) determining if the buffered target sector header is greater than the correct target, if the CRC does not indicate an error.

2. The method of claim 1, wherein the finding step (b) comprises:

(b1) setting a required number of valid headers to be found within the search window;

(b2) performing validation on a plurality of sector headers within the search window; and (b3) determining if the required number of valid headers within the search window has been found.

3. The method of claim 2, further comprising:

(b4) redoing the data read if the required number of valid headers within the search window has not been found.

4. The method of claim 1, wherein the locating step (c) comprises:

(c1) locating the target sector using the at least one valid header as a reference.

5. The method of claim 1, wherein the buffering step (d) comprises:

(d1) buffering a first row of the data.

6. The method of claim 5, further comprising:

(d2) performing row correction on the first row of the data.

7. The method of claim 1, further comprising:

(e4) rolling back a buffer pointer if the buffered target sector header is not greater than the correct target; and (e5) restarting a header search.

8. The method of claim 7, further comprising:

(e6) redoing the data read if the CRC indicates an error.

9. The method of claim 1, further comprising:

(e3) continuing buffering of data if the CRC does not indicate an error.

10. A method for providing a header search in a data read from an optical medium, comprising the steps of:

(a) opening a search window with a size greater than one sector;

(b) finding at least one valid header within the search window;

(c) locating a target sector based upon the at least one valid header;

(d) buffering data beginning at the target sector; and (e) performing validation of a buffered target sector header, wherein the validating step (3) comprises:
  (e1) determining if the buffered target sector header is a correct target:
  (e2) determining if a column correction has been performed, if the buffered target sector header is not the correct target;
  (e3) buffering all rows of the data read if the column correction has not been performed;
  (e4) performing the column correction; and
  (e5) returning to step (e1).

11. The method of claim 10, further comprising:
  (e6) determining if the buffered target sector header is greater than the correct target, if the column correction has been performed.

12. The method of claim 11, further comprising:
  (e7) rolling back a buffer pointer if the buffered target sector header is not greater than the correct target; and
  (e8) restarting a header search.

13. The method of claim 11, further comprising:
  (e7) redoing the data read if the buffered target sector header is greater than the correct target.

14. The method of claim 11, further comprising:
  (e7) continuing buffering of data if the buffered target sector header is greater than the correct target; and
  (e8) reading and buffering a missing sector.

15. The method of claim 10, further comprising:
  (e3) continuing buffering of data if the buffered target sector header is the correct target.

16. A method for providing a header search in a data read from an optical medium, comprising the steps of:
  (a) setting a required number of valid headers to be found within a search window;
  (b) opening the search window with a size greater than one sector;
  (c) performing validation on a plurality of sector headers within the search window;
  (d) determining if the required number of valid headers within the search window has been found; and
  (e) locating the target sector using the valid plurality of sector headers as a reference.

17. The method of claim 16, further comprising:
  (f) redoing the data read if the required number of valid headers within the search window has not been found.

18. A method for providing a header search in a data read from an optical medium, comprising the steps of:
  (a) opening a search window with a size greater than one sector;
  (b) finding at least one valid header within the search window;
  (c) locating a target sector based upon the at least one valid header;
  (d) buffering data beginning at the target sector;
  (e) determining if the buffered target sector header is a correct target;
  (f) determining if a CRC indicates an error;
  (g) determining if the buffered target sector header is greater than the correct target, if the buffered target sector header is not the correct target and the CRC does not indicate an error, further comprising:
    (g1) rolling back a buffer pointer if the buffered target sector header is not greater than the correct target, and
    (g2) restarting a header search; and
  (h) redoing the data read if the CRC indicates an error.

19. The method of claim 18, further comprising:
  (i) continuing buffering of data if the CRC does not indicate an error.

20. A method for providing a header search in a data read from an optical medium, comprising the steps of:
  (a) opening a search window with a size greater than one sector;
  (b) finding at least one valid header within the search window;
  (c) locating a target sector based upon the at least one valid header;
  (d) buffering data beginning at the target sector;
  (e) determining if the buffered target sector header is a correct target;
  (f) determining if a column correction has been performed, if the buffered target sector header is not the correct target, further comprising:
    (f1) buffering all rows of the data if the column correction has not been performed,
    (f2) perform the column correction, and
    (f3) return to step (e); and
  (g) determining if the buffered target sector header is greater than the correct target, if the column correction has been performed, further comprising:
    (g1) rolling back a buffer pointer if the buffered target sector header is not greater than the correct target, and
    (g2) restarting a header search.

21. The method of claim 20, further comprising:
  (h) redoing the data read if the buffered target sector header is greater than the correct target.

22. The method of claim 20, further comprising:
  (h) continuing buffering of data if the buffered target sector header is greater than the correct target; and
  (i) reading and buffering a missing sector.

23. The method of claim 20, further comprising:
  (h) continuing buffering of data if the buffered target sector header is the correct target.

* * * * *